H. C. JANES.
HEATING DRUM.
APPLICATION FILED NOV. 12, 1917.
1,324,157.
Patented Dec. 9, 1919.
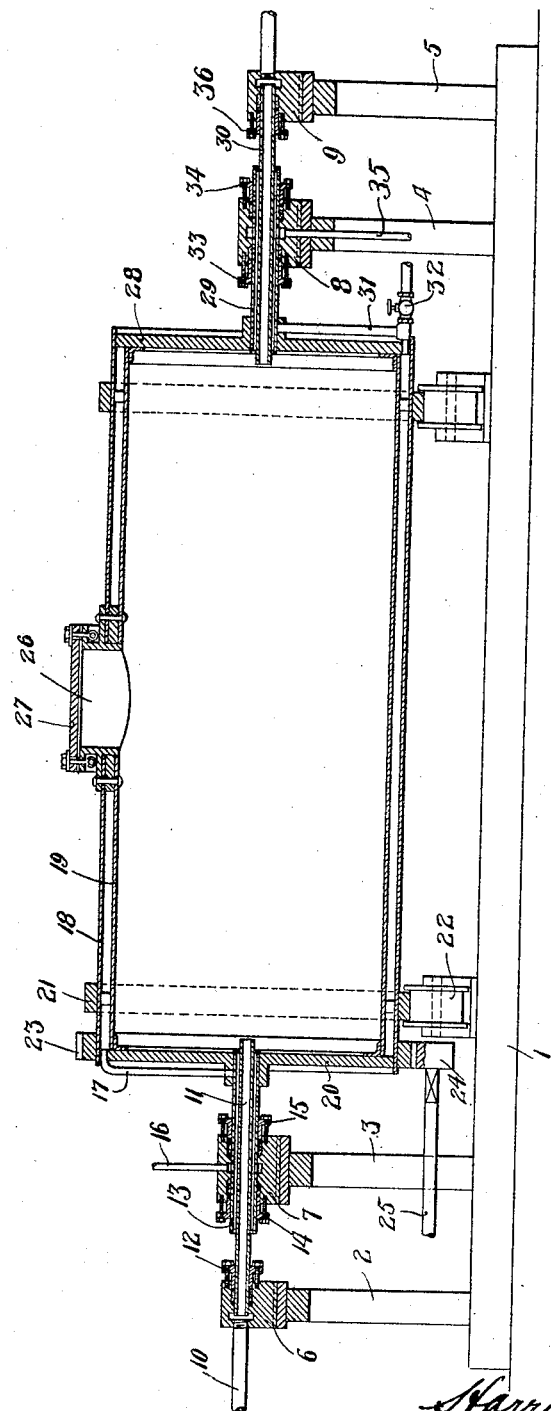
INVENTOR
Harry C. Janes
BY
Prindle, Wright & Small
ATTORNEY

UNITED STATES PATENT OFFICE.

HARRY C. JANES, OF WILMINGTON, DELAWARE, ASSIGNOR TO E. I. DU PONT DE NEMOURS AND COMPANY, OF WILMINGTON, DELAWARE, A CORPORATION OF DELAWARE.

HEATING-DRUM.

1,324,157.     Specification of Letters Patent.     Patented Dec. 9, 1919.

Application filed November 12, 1917. Serial No. 201,624.

*To all whom it may concern:*

Be it known that I, HARRY C. JANES, of Wilmington, in the county of New Castle, and in the State of Delaware, have invented a certain new and useful Improvement in Heating-Drums, and do hereby declare that the following is a full, clear, and exact description thereof.

My invention relates particularly to an apparatus in the form of a drum, adapted to be heated in an effective manner, and which may be applied to many different purposes.

The object of my invention is to provide a heating drum which is arranged so that it may be advantageously heated, and which may be constructed with a minimum amount of labor and at a minimum cost.

A further object of my invention is to provide an apparatus of this character which is so constructed that it is free from any danger of leakage.

Further objects of my invention will appear from the detailed description thereof contained hereinafter.

While my invention is capable of being carried out in many different ways, for the purpose of illustration I have shown only one way of carrying out the same in the accompanying drawings, in which The figure is a vertical section of an apparatus made in accordance with my invention.

In the drawings, I have shown a base plate 1, having a plurality of uprights 2, 3, 4 and 5, provided, respectively, with bearings 6, 7, 8 and 9. A fluid inlet pipe 10 enters the bearing 6, and said bearing 6 is arranged to receive therein a rotary fluid supply pipe 11, having a stuffing box 12. Said pipe 11, furthermore, passes into a sleeve 13, located in the bearing 7, and provided with stuffing boxes 14 and 15. The sleeve 13 is also rotary and is connected with a steam supply pipe 16. Steam is thus provided in the space between the sleeve 13 and the pipe 11, which is fed, by means of a radial pipe 17, to a steam jacket 18 on a drum 19, which has a head 20, fitting over the end of the sleeve 13. Said drum 19 is supported by means of tracks 21 upon rollers 22, located in pairs at the two ends of the cylinder, and, furthermore, in order to rotate the drum 19, it is provided with a peripheral rack 23, meshing with a gear 24, on a shaft 25, which may be driven from any suitable source of power. Intermediate its ends, the drum 19, furthermore, has an inlet opening 26, closed by a bolted door 27. At the other end, the drum 19 is provided with a head 28, fitting over a rotary sleeve 29, surrounding a rotary fluid pipe 30, so as to provide a steam space between the same connected by a pipe 31 to the jacket 18. A draw-off cock 32 permits the condensed water to be drawn off from the jacket 18. Said sleeve 29 passes through the bearing 8, where it is provided with two stuffing boxes 33 and 34, and in said bearing 8 there is provided a steam exhaust pipe 35 from the space between the sleeve 29 and the pipe 30. The end of the pipe 30 is supported in the bearing 9, where it is provided with a stuffing box 36. Said bearing 9 also has a fluid outlet pipe 37.

In the operation of my invention, any desired materials which are to be heated may be introduced into the drum 19 through the opening 26 and the door 27 bolted in place to close the same. Thereupon steam may be introduced by the pipe 16 and the drum may be rotated by means of the shaft 25. As the drum is rotated, a fluid, which may be vapor or liquid, is supplied from the pipe 10, and is exhausted through the pipe 37, while steam will be continually supplied from between the sleeve 13 and the pipe 11 to the pipe 17 and thence to the jacket 18, and condensed steam will flow away by means of the pipe 31 to the space between the sleeve 29 and the pipe 30, and thence out through the pipe 35.

If at any time it is desired to draw off condensed water from the jacket 18, this may be done by stopping the drum and opening the cock 32.

By using the radial pipes 17 and 31, a very effective construction is provided, inasmuch as the parts may be very readily constructed and at a low cost, and at the same time there is little or no danger of leakage.

While I have described my invention above in detail, I wish it to be understood that many changes may be made therein without departing from the spirit thereof.

I claim:

In combination, a rotary drum having heads at each end, a jacket inclosing said drum and secured to said head, an axial fluid supply pipe passing through one of said heads to the interior of said drum, a sleeve inclosing a portion of said fluid supply pipe and secured to said last mentioned head, a radial pipe leading from said sleeve to said jacket, said supply pipe and sleeve both being rotatable with the drum, fixed bearings respectively for said sleeve and supply pipe, and means located respectively at said bearings for supplying fluid to said supply pipe and sleeve.

In testimony that I claim the foregoing, I have hereunto set my hand.

HARRY C. JANES.

Witnesses:
    P. E. STRICKLAND,
    H. L. BRADLEY.